US008252415B2

(12) United States Patent
Kaya et al.

(10) Patent No.: US 8,252,415 B2

(45) Date of Patent: Aug. 28, 2012

(54) SAND MAKING APPARATUS, SAND MAKING METHOD, AND MADE SAND

(75) Inventors: Takato Kaya, Hiroshima (JP); Katsuyoshi Hashimoto, Hiroshima (JP); Kiyotoshi Nakaue, Hiroshima (JP); Yuichi Nagahara, Hiroshima (JP); Ken Shimazutsu, Hiroshima (JP)

(73) Assignee: Kotobuki Engineering & Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/717,739

(22) Filed: Mar. 4, 2010

(65) Prior Publication Data

US 2010/0159247 A1 Jun. 24, 2010

Related U.S. Application Data

(63) Continuation of application No. PCT/JP2008/002398, filed on Sep. 2, 2008.

(30) Foreign Application Priority Data

Sep. 4, 2007 (JP) ................................ 2007-229022

(51) Int. Cl.
*B32B 5/66* (2006.01)

(52) U.S. Cl. ........................ 428/402; 241/68; 241/198.1

(58) Field of Classification Search .................. 428/402; 241/68, 198.1

See application file for complete search history.

(56) References Cited

FOREIGN PATENT DOCUMENTS

| | | | |
|---|---|---|---|
| EP | 58189080 | | 11/1983 |
| JP | 4-131446 | | 12/1992 |
| JP | 09-103745 | | 4/1997 |
| JP | 2003/010725 | * | 1/2003 |
| JP | 2003010725 | | 1/2003 |
| JP | 2004141713 | | 5/2004 |
| JP | 2006231125 | | 9/2006 |
| WO | 2006070866 A1 | | 7/2006 |

OTHER PUBLICATIONS

First Examiner's Report in connection with Australian Patent Application No. 2008294274, issued Nov. 10, 2010, 3 pages.
European Search Report relating to European Application No. 08829507.6, mailed Mar. 10, 2011, 7 pages.
Office Action dated Sep. 15, 2011 in corresponding Chinese Application No. 200880105569.7 + English Translation, 4 pages.
Office Action dated Mar. 22, 2012, in counterpart European Application No. 08 829 507.6, 5 pages.

* cited by examiner

*Primary Examiner* — Leszek Kiliman
(74) *Attorney, Agent, or Firm* — Seed IP Law Group PLLC

(57) ABSTRACT

A sand making apparatus comprises: a crusher configured to crush crushed materials; a first sorter configured to sort the crushed materials obtained from the crusher into coarse particles, fine particles, and powders through air sorting by air blowing and screening sorting by a screen; a negative pressure collection unit configured to suck and collect the powders from the first sorter; and a second sorter disposed between the first sorter and the negative pressure collection unit, the second sorter configured to sort the powders into coarse powders and fine powders through negative pressure of the negative pressure collection unit.

3 Claims, 4 Drawing Sheets

SAND MAKING APPARATUS, SAND MAKING METHOD, AND MADE SAND

CROSS REFERENCE TO RELATED APPLICATIONS

This is a continuation application of International Patent Application No. PCT/JP2008/002398 filed Sep. 2, 2008, claiming priority to JP2007-229022 filed Sep. 4, 2007, of which full contents are incorporated herein by reference.

BACKGROUND OF THE INVENTION

1. Field of the Invention

The present invention relates to a sand making apparatus that makes sand having a uniform particle size by sorting crushed minerals into plural kinds according to particle sizes, a sand making method, and made sand. More particularly, the present invention relates to a sand making apparatus, a sand making method, and made sand that enable effective use of excess by-product powders generated in a crushing process.

2. Description of the Related Art

The present applicants previously applied for a patent on a device and a method for sorting minerals (hereinafter, referred to as "crushed materials") crushed by a crusher into particles (hereinafter, referred to as "coarse particles") having a particle size larger than a desired particle size, particles (hereinafter, referred to as "fine particles") having a particle size equal to the desired particle size, and particles (hereinafter, referred to as "powders") having a particle size smaller than the desired particle size, by a combination of air sorting and screening sorting.

A sorter that is disclosed in Patent Document 1 crushes crushed materials, appropriately sorts the crushed materials according to sorted particle sizes, and causes powders generated in a crushing process to be sucked and collected by the negative pressure from a dust collector and stored as excess by-product powders (fillers) in a reservoir (Japanese Patent Application Laid-Open No. 2003-10725).

In the related art, if a large amount of powders that have an average particle size of about 75 μm or less are mixed in made sand, this adversely affects properties (flow value or slump value) of concrete using the made sand as a fine aggregate. For this reason, when a mineral ore is crushed and sand is made, as described in Patent Document 1, a method that sorts crushed materials into coarse particles, fine particles, and powders and collects only the fine particles as made sand is adopted.

However, according to a discovery from recent studies, in regards to a relationship between the fine aggregate and the properties of the concrete, even though only powders having relatively large particle sizes (fine particles that have an average particle size that is not smaller than about 20 to 40 μm and not more than 300 μm) among excess by-product powders generated in the sand making process are mixed with the fine aggregate, this rarely affects the properties of the concrete.

From the discovery and a viewpoint of effective use of the excess by-product powders, it is desirable that the sorter sort crushed materials into coarse particles, fine particles, powders (hereinafter, referred to as "coarse powders") having a relatively large particle size, and powders (hereinafter, referred to as "fine powders) having a relatively small particle size, and finally collect the fine particles including the coarse powders as the made sand.

However, if one sorter is used to perform work for sorting the crushed materials such as the mineral ore into four kinds of materials (sorting the crushed materials into the coarse particles, the fine particles, the coarse powders, and the fine powders), the size of the sorter may greatly increase as compared with a sorter that performs work for sorting the crushed materials into three kinds of materials (sorting the crushed materials into the coarse particles, the fine particles, and the powders), and it is difficult to actually operate the sorter.

Accordingly, it is an object of the present invention to provide a sand making apparatus that can easily sort sorted powders into coarse powders and fine powders and mix the coarse powders as made sand, while using the conventional sorter that performs the three kinds of sorting (coarse particles, fine particles, and powders), a sand making method, and made sand.

SUMMARY OF THE INVENTION

A sand making apparatus according to a first aspect of the invention to accomplish the above-described object, comprises: a crusher configured to crush crushed materials; a first sorter configured to sort the crushed materials obtained from the crusher into coarse particles, fine particles, and powders through air sorting by air blowing and screening sorting by a screen; a negative pressure collection unit configured to suck and collect the powders from the first sorter; and a second sorter disposed between the first sorter and the negative pressure collection unit, the second sorter configured to sort the powders into coarse powders and fine powders through negative pressure of the negative pressure collection unit.

In the sand making apparatus according to a second aspect of the invention, an average particle size for sorting the powders into the coarse powders and the fine powders in the second sorter is 20 μm to 75 μm.

A sand making method according to a third aspect of the invention, comprises: crushing crushed materials by a crusher; sorting the crushed materials obtained from the crusher into coarse particles, fine particles, and powders through air sorting by air blowing and screening sorting by a screen; sucking the sorted powders; and sorting the sucked powders into coarse powders and fine powders through air sorting, and mixing the coarse powders with the sorted fine particles.

In the sand making method according to a fourth aspect of the invention, an average particle size for sorting the powders into the coarse powders and the fine powders is 20 μm to 75 μm.

A made sand obtained by crushing a mineral ore and sorting crushed materials, according to particle sizes according to a fifth aspect of the invention, comprises: fine particles sorted as having particle sizes in a range of 5 mm to 20 μm, the fine particles being 75 to 85 weight percentages out of a total amount of crushed materials; and coarse powders sorted as having particle sizes in a range of 300 μm to 20 μm, the coarse powders being 3 to 15 weight percentages out of the total amount of the crushed materials.

The sand making apparatus, the sand making method, and the made sand according to the present invention can obtain at least one of the following effects.

(1) Effective Use of the Excess by-Product Powders and Reduction of the Discharge Amount.

In the conventional sand making process, a ratio of the excess by-product powders occupies about 20% of the crushed materials. According to the present invention, since several tens of percentages of the excess by-product powders can be recovered as the made sand, the excess by-product powders can be reduced and a cost of discharging work can be reduced.

(2) Improvement of Qualities of Made Sand and Concrete

Since only the coarse powders among the excess by-product powders are sorted and recovered as the made sand, the fine powders can be avoided from being mixed and the properties of the concrete can be maintained. In addition, a flow value or a slump value can be increased.

(3) Prevention of a Size Increase of the Sand Making Apparatus

According to the present invention, one sorter that can sort the four kinds of particle sizes does not need to be newly developed and manufactured, and the four kinds of particle sizes can be sorted while the existing sorter is used.

In the present invention, since the sorter for the excess by-product powders is provided in the middle of the conventional sorter for the three kinds of particle sizes and the negative pressure collection unit, only the arrangement configuration of the existing sand making apparatus may be slightly changed. Since the powders are sorted using the suction force generated by the negative pressure collection unit, a blower does not need to be newly provided.

As described in the previous item of (1), since the discharge amount of the excess by-product powders is reduced, the reservoir having a small size can be formed as compared with the related art. As a result, before and after the sand making apparatus is changed, the apparatus scale does not greatly change. If the apparatus scale changes, an arrangement space needs to be reexamined on the actual spot, and a blank period is extended (spot work may be stopped). However, according to the present invention, the above problem can be avoided in advance.

DETAILED DESCRIPTION OF THE PREFERRED EMBODIMENTS

Hereinafter, an embodiment of the present invention will be described with reference to the accompanying drawings. This embodiment is only exemplary and does not limit a technical range of the present invention.

<1> Entire Configuration

Figure 1:
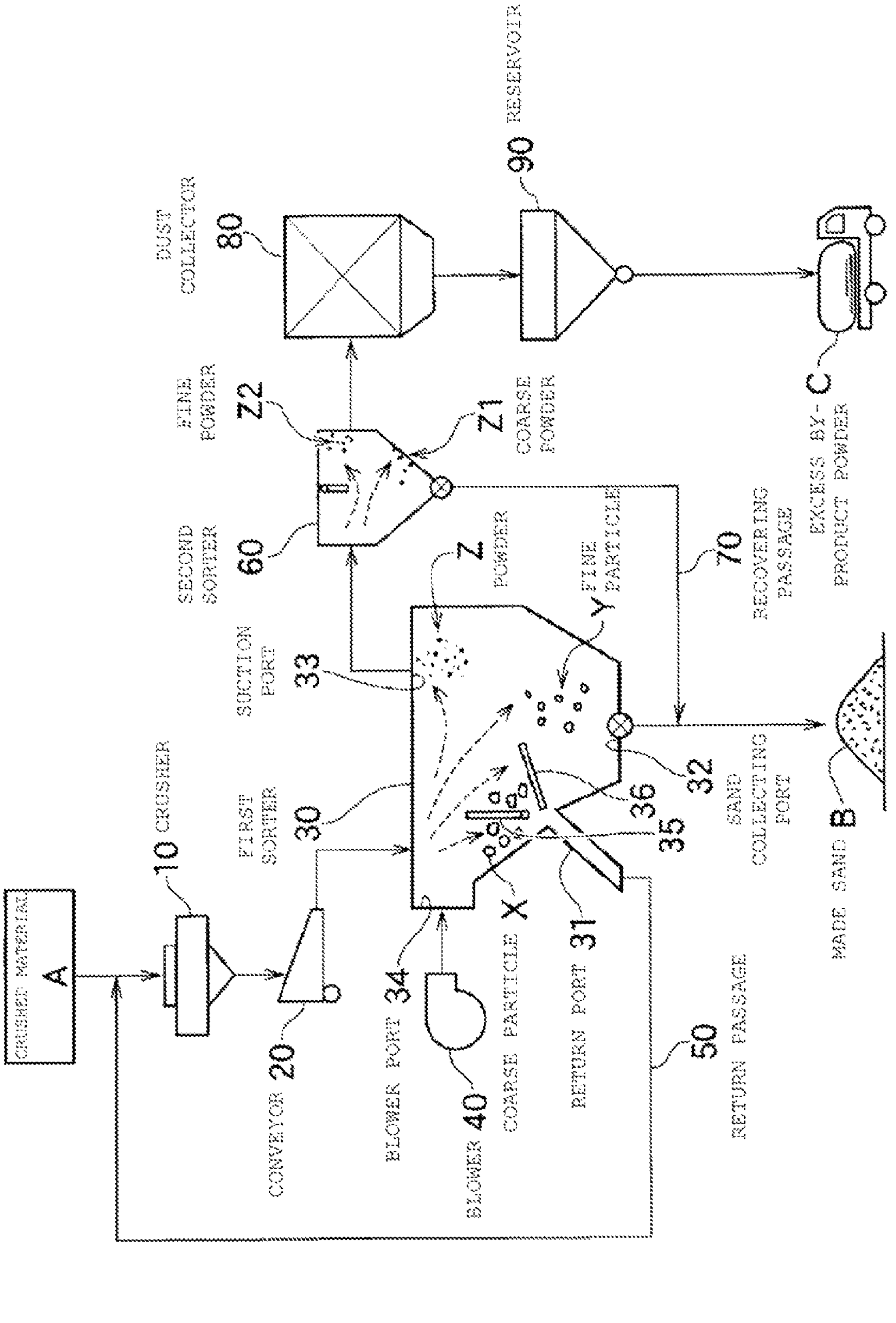
FIG. 1 is a schematic diagram illustrating one example of a sand making apparatus according to the present invention.

FIG. 1 is a schematic diagram illustrating an apparatus according to an embodiment of the present invention.

The entire configuration of a sand making apparatus according to this embodiment includes at least a crusher 10 that is a unit to crush crushed materials A, a conveyor 20 that is a unit to convey the crushed materials, a first sorter 30 that is a unit to sort the crushed materials obtained from the crusher 10 into coarse particles X, fine particles Y, and powders Z by air sorting based on air blowing and screening sorting based on a screen, a blower 40 that is a unit to blow air into the first sorter 30, a dust collector 80 that is a unit to suck the powders Z in the first sorter 30 and collect the powders, a second sorter 60 that is a unit to sort the powders Z into coarse powders Z1 and fine powders Z2 using the negative pressure of the dust collector 80, which is provided in a middle of the first sorter 30 and the dust collector 80, and a recovering passage 70 that is a unit to mix the coarse powders Z1 sorted by the second sorter and the fine particles Y sorted by the first sorter.

In this embodiment, a return passage 50 that is a unit to collect the coarse particles X in the first sorter 30 and return the coarse particles to the crusher 10 is further provided. However, since the return passage is appropriately disposed according to a specification, the return passage is not included in essential components of the present invention.

A kneading device (not illustrated) that kneads collected made sand B with water may be provided. However, the kneading device is not included in the essential components of the present invention.

<2> Device Group

Hereinafter, the device group that constitutes the sand making apparatus will be simply described.

[Crusher]

As the crusher 10, crushers having various known crush formats may be applied. The crusher 10 of FIG. 1, that is a centrifugal crusher, has a structure in which crushed materials are naturally dropped downward.

[Conveyor]

As the conveyor 20, a known conveyance unit, such as a belt conveyer, is used. In the conveyor 20, a vibration exciter (not illustrated) may be provided such that crushed materials discharged from the crusher 10 are spread and are disposed on the conveyer.

[First Sorter]

The first sorter is a device that has a function of sorting the crushed materials supplied from the crusher into the coarse particles X, the fine particles Y, and the powders Z by air sorting based on air blowing and screening sorting based on a screen.

The first sorter 30 illustrated in FIG. 1 has at least a return port 31 that communicates with a return passage 50 used to return the coarse particles X to the crusher 10 and execute a crushing process again, a sand collecting port 32 that collects the fine particles, a suction port 33 that collects the powders, and a blower port 34 that communicates with the blower 40.

In addition, a known dispersion device (not illustrated) that naturally sorts the crushed materials according to particle sizes, an adjustment plate 35 that changes a sorted region of the crushed materials dropped by air sorting, and a screen 36 that performs screening sorting are provided to implement the air sorting and the screening sorting.

[Dust Collector and Reservoir]

The dust collector 80 is a device that generates the negative pressure to suck and collect the powders Z through the suction port 33 of the first sorter 30 and a dust collection passage.

The reservoir 90 is a device that collects the powders (fine powders Z2) collected by the dust collector 80.

<2> Second Sorter

The second sorter 60 is a device that is provided inbetween (i.e. along the dust collection passage) from the first sorter 30 to the dust collector 80 and has a function of sorting the powders Z sucked from the first sorter 30 into the coarse powders Z1 and the fine powders Z2 using the negative pressure generated by the dust collector 80.

The internal structure of the second sorter described below is simply exemplary and can be appropriately changed according to the device specification, such as the crushed materials and the sorted particle sizes.

Figure 2A:
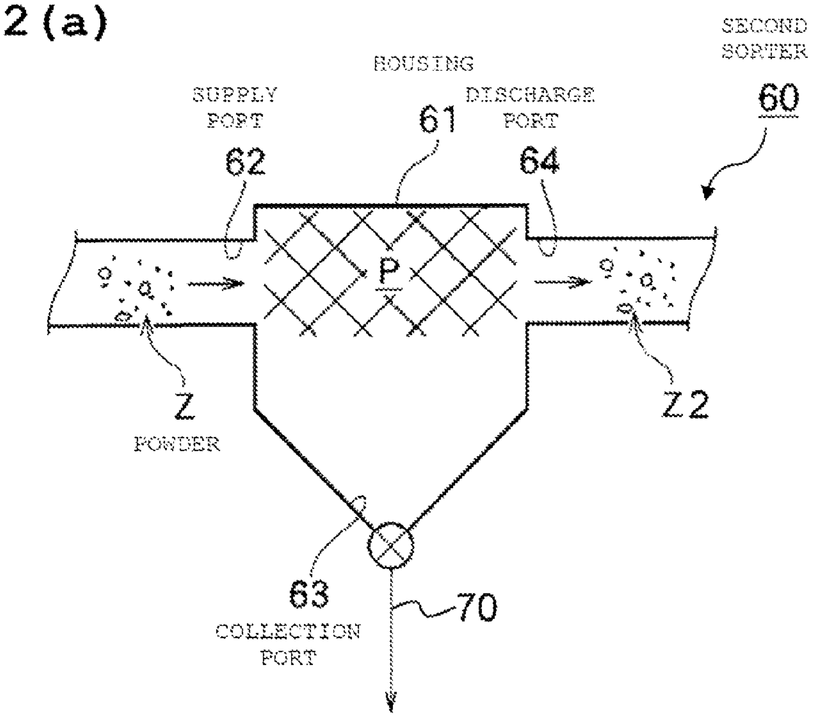
FIGS. 2(*a*) and 2(*b*) are schematic diagrams illustrating a structure of a second sorter in FIG. 1.
Figure 2B:
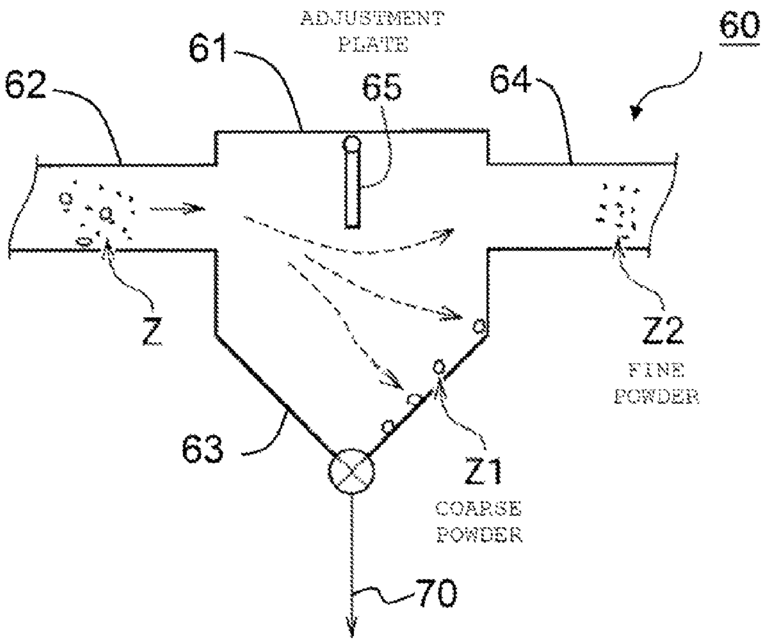

FIGS. 2(*a*) and 2(*b*) are schematic diagrams illustrating the operation of an example of the second sorter.

The second sorter 60 illustrated in FIG. 2(*b*) has a housing 61 that has a sealed structure and an adjustment plate 65 that is disposed in the housing.

[Housing]

In the housing 61, a supply port 62 to communicate with the suction port 33 of the first sorter and receive the powders Z inside, a collection port 63 to collect the coarse powders Z1 sorted in the housing and communicate with a recovering passage 70 joining with a pipe for the fine particles Y sorted by the first sorter 30, and a discharge port 64 to communicate with the dust collector 80 and collect the fine powders Z2 are formed. A direction of a straight line that connects the supply port 62 and the discharge port 64 is substantially parallel to a horizontal direction, and the collection port 63 is provided below the straight line.

[Adjustment Plate]

The adjustment plate 65 is configured such that the adjustment plate 65 is disposed to extend downward from the top of an inner portion of the housing 61, and shields a portion of a passage region P (region defined by connecting the supply port 62 and the discharge port 64 with the straight line) of the powders Z when the adjustment plate 65 is not disposed (refer to FIG. 2(*a*)).

If the adjustment plate 65 is moved or rotated in a vertical direction, a horizontal direction, and an anterior-posterior direction in FIG. 2(*b*), a shielding ratio of the passage area of the powders can be changed. If the shielding ratio is changed, the suction force (negative pressure) that the powders Z receive can be changed.

When the shielding ratio increases, the powders Z having small weight is not sucked by the dust collector 80 and dropped, and are separated into the collection port 63. That is, the shielding ratio is inversely proportional to a value of the sorted particle size.

The arrangement relationship between the supply port 62, the collection port 63, the discharge port 64, and the adjustment plate 65 is not limited to the arrangement relationship illustrated in FIGS. 1, 2(*a*) and 2(*b*).

The adjustment plate 65 may be disposed to shield the passage region P where the powders Z are sucked from the supply port 62 to the discharge port 64 before the adjustment plate 65 is disposed, and the collection port 63 may be formed at a position where the powders are not sucked and are dropped by the shielding of the passage region P.

The second sorter 60 may perform the screening sorting based on the screen instead of the air sorting or together with the air sorting.

A sand making method using the sorters and an experiment result will be described below.

<3> Sand Making Method

[Crushing Process]

The crushed materials A that are supplied to the crusher 10 and/or the coarse particles X that are returned by the first sorter 30 are crushed. The crushed materials are conveyed to a slot of the first sorter 30, while being naturally sorted by the conveyor 20 including a vibration mechanism.

[First Sorting Process (Air Sorting and Screening Sorting) and Returning Process]

The crushed materials that are conveyed to the slot of the first sorter 30 receive the air from the blower port 34 at the time of being dropped, are blown in a horizontal direction, are separated in a horizontal direction for each weight (particle size), and are subjected to the auxiliary screening sorting by the adjustment plate 35 and the screen 36 provided in the middle. By performing the air sorting and the screening sorting, the coarse particles X are collected by the return port 31, the fine particles Y are collected by the sand collecting port 32, and the powders Z are sucked and collected from the suction port 33.

The coarse particles that are collected by the return port 31 are conveyed to the crusher 10 through the return passage 50, such that the coarse particles can be crushed again.

[Second Sorting Process]

The powders Z that are sucked and collected from the first sorter 30 are supplied to the supply port 62 of the second sorter 60. The powders Z that are transmitted to the second sorter 60 are drawn toward the side of the discharge port 64 by the suction force generated from the discharge port 64 communicating with the dust collector 80. However, the powders Z receive interference by the adjustment plate 65 provided in the middle, and start to be acted upon by gravity; the powders (coarse powders Z1) having large weight (particle size) are dropped as they are, or are guided to sidewalls of the housing and are guided to the collection port 63 provided at a lower side. The powders (fine powders Z2) that have small weight are sucked to the discharge port 64 as they are and are collected to the reservoir 90 through the dust collector 80.

The shielding ratio (interference ratio) can be changed according to a tilt angle of the adjustment plate 65, and sorted particle sizes of the coarse powders Z1 and the fine powders Z2 can be arbitrarily changed.

The coarse powders Z1 that are collected to the collection port 63 join with the pipe of the fine particles Y, such that the coarse powders are mixed with the fine particles Y sorted by the first sorter 30.

At least the above processes are executed, and the crushed materials are sorted into particles of four kinds or fine particles and sand having a high quality is made.

<4> Experiment Result

Next, the experiment result based on the sand making method using the sand making apparatus will be described.

In this example, the apparatus is configured to sort particle sizes as follows, using sand stone as the crushed materials.

[Before Arrangement of the Second Sorter]

Figure 3:
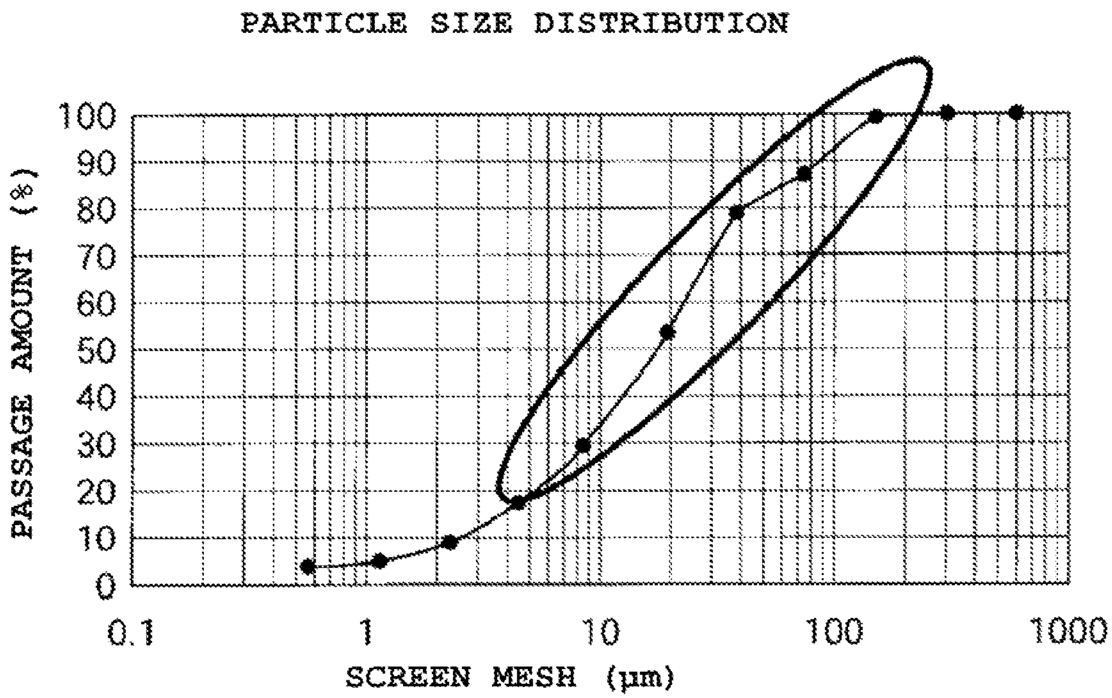
FIG. 3 is a graph illustrating particle size distribution of excess by-product powders.

First, a particle size distribution of excess by-product powders C (equal to the powders Z) that are stored in the reservoir before the arrangement of the second sorter 60 is illustrated in FIG. 3.

As can be seen from FIG. 3, in the excess by-product powders C, a gradient increases from when screen meshes are set to about 10 μm (passage amount increases). That is, it can be seen that it is desirable to effectively use the powders having particle sizes of about 10 μm or more in order to efficiently improve a yield of the crushed materials.

[After Arrangement of the Second Sorter]

Next, an average value of sorted particle sizes (hereinafter, simply referred to as "sorted particle size") of the coarse powders Z1 and the fine powders Z2 by the second sorter 60 is varied and an experiment is performed for each case. The sorted particle sizes of the other particles and each experiment data are set as follows.

[Sorted Particle Sizes of Coarse Powders and Fine Powders]

Case 1: none (discharge the total amount of powders sorted by the first sorter to the reservoir)

Case 2: 150 μm

Case 3: 75 μm

Case 4: 40 μm

Case 5: 20 μm

Case 6: none (knead the total amount of powders sorted by the first sorter with the fine particles)

[In this case, the crushed materials are sand stone, the coarse particles have particle sizes that are not smaller than 3 to 5 mm, and the fine particles have particle sizes of 2 to 4 mm.

A performance table of concrete using the made sand that is obtained from each case is illustrated in the following Table 1 and FIG. 4.

TABLE 1

Comparison of concrete properties based on sorted particle sizes

| | Case | | | | | |
|---|---|---|---|---|---|---|
| | 1 | 2 | 3 | 4 | 5 | 6 |
| Sorted particle sizes (μm) | Discharge the total amount | 150 | 75 | 40 | 20 | Knead the total amount |
| Yield (%) | 80 | 82.6 | 87.5 | 92.2 | 95.5 | 100 |
| Slump (cm) | 19 | 18.5 | 20 | 19.5 | 19 | 14.5 |
| Flow (cm) | 26 × 27<br>26.5 | 24 × 26<br>25 | 30 × 32<br>31 | 28 × 30<br>29 | 26 × 27<br>26.5 | 22 × 24<br>23 |
| Determination | medium | medium | high | high | medium | low |

Figure 4:
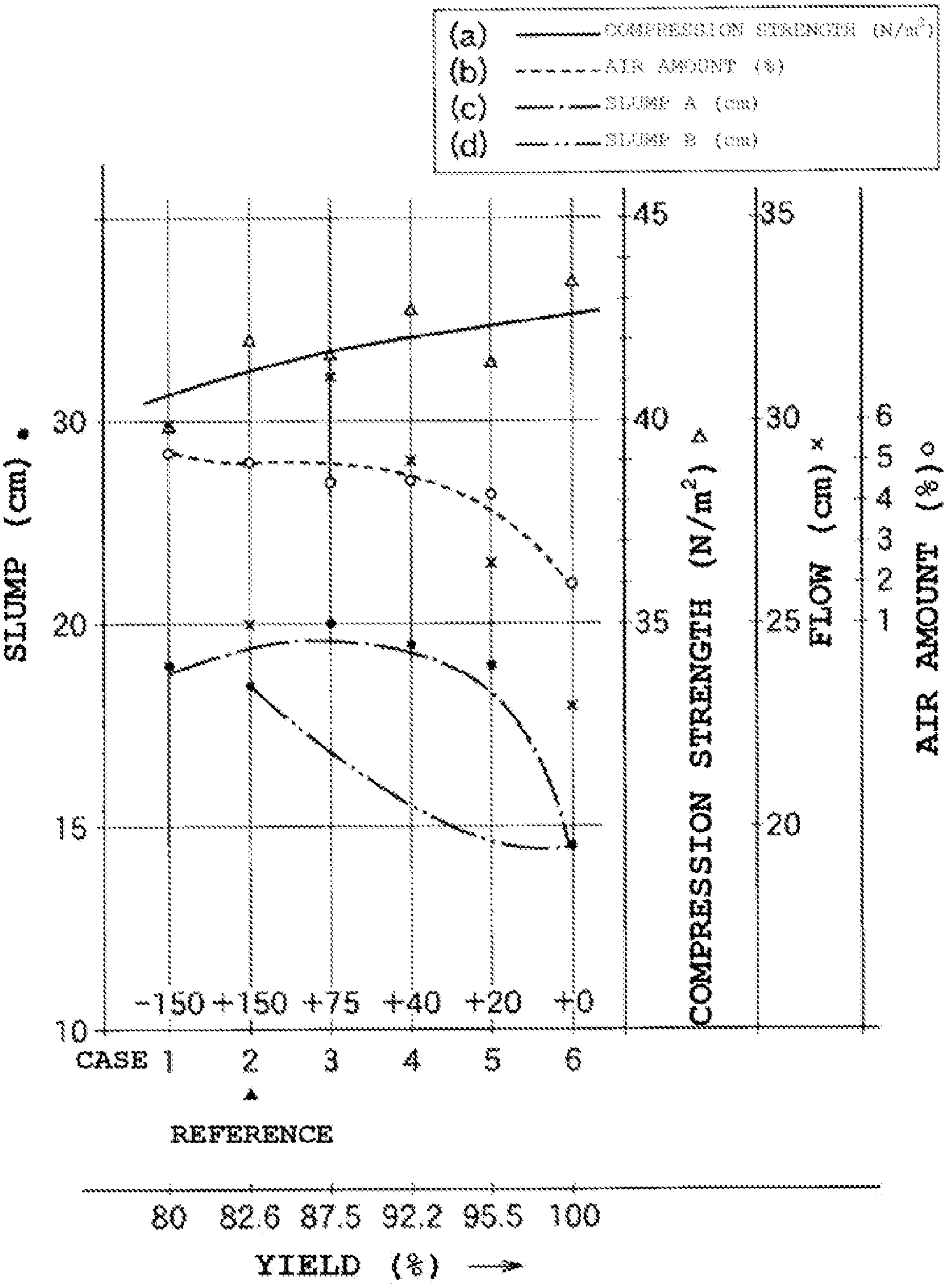
FIG. 4 is a comparative view illustrating properties of concrete based on a sorted particle size.

FIG. 4 is a comparative view of the concrete properties according to Table 1. In FIG. 4, compression strength (a), an air value (b), a flow value, and a slump value (c) for each case, and a slump value (d) of when the powders are added to the fine particles by the predetermined amount in a state where the powders collected by the first sorter are not sorted and the powders of all particle sizes are mixed are illustrated.

As can be seen from Table 1 and FIG. 4, in regards to the cases 3 and 4, the slump value and the flow value are improved as compared with the case 1 (when the total amount of powders are discharged in the related art), and there is no problem in the concrete properties.

In regards to the case 5, the yield is improved as compared with the cases 3 and 4 and the slump value and the flow value slightly decrease as compared with the case 3. However, a superior result is obtained as compared with the case where the total amount of powders is kneaded.

If graphs (c) and (d) of FIG. 4 are compared with each other, it can be seen that a large difference is generated in the slump value of the concrete according to whether the powders are sorted or not, even in the same yield. Accordingly, as in the present invention, if only the coarse powders that are obtained by sorting the collected powders according to a specific particle size are added to the fine particles, the slump value can be prevented from decreasing, while the yield is improved.

From the above result, it can be seen that the powders are sorted using the sorted particle sizes as particle sizes in a range of the particle sizes of the cases 3 and 4 and the coarse powders are added to the fine particles, thereby improving the properties of the concrete. In particular, in the case 4 (the powders having particle sizes of about 40 μm or more are set as the coarse powders and the powders having particle sizes smaller than about 40 μm are set as the fine powders), the yield is improved by about 12% as compared with the yield of when the total amount of powders are discharged. As a result, in addition to the effect of the improvement of the concrete properties, an effect of decreasing the excess by-product powders (improvement of the yield) can be obtained.

An optimum value of the sorted particle size may be changed according to the kind of crushed material. However, if the sorted particle sizes are determined in a range of 20 μm to 75 μm, the effects of improving the yield and the concrete properties can be obtained. In particular, a superior effect can be obtained in a range of 20 μm to 40 μm.

What is claimed is:

1. A sand making apparatus comprising:

a crusher configured to crush crushed materials;

a first sorter configured to sort the crushed materials obtained from the crusher into coarse particles, fine particles, and powders through air sorting by air blowing and screening by sorting with a screen, the first sorter including a first collection port for collecting the fine particles sorted by the first sorter;

a negative pressure collection unit configured to suck and collect at least a portion of the powders sorted by the first sorter;

a second sorter disposed between the first sorter and the negative pressure collection unit, the second sorter configured to sort the powders into coarse powders and fine powders by sucking the powders through negative pressure of the negative pressure collection unit so as to transmit the fine powders in a direction of the negative pressure while allowing the coarse powders to be dropped by gravity, the second sorter including a second collection port for collecting the coarse powders dropped by gravity, and wherein an average particle size for sorting the powders into the coarse powders and the fine powders is 20 μm to 75 μm; and a recovering passage configured to mix the coarse powders collected by the second collection port of the second sorter and the fine particles collected by the first collection port of the first sorter, whereby a mixture of the coarse powders and the fine particles is collected through the recovering passage, while the fine powders are discharged in such a manner that the fine powders are sucked and collected by the negative pressure collection unit.

2. A sand making method comprising:

crushing crushed materials by a crusher;

sorting the crushed materials obtained from the crusher into coarse particles, fine particles, and powders through air sorting by air blowing and screening by sorting with a screen, and collecting the fine particles that are sorted;

sucking and collecting the sorted powders by a negative pressure collection unit;

sorting the sucked and collected powders into coarse powders and fine powders by sucking the powders through negative pressure of the negative pressure collection unit so as to transmit the fine powders in a direction of the negative pressure while allowing the coarse powders to be dropped by gravity, and collecting the coarse powders that are dropped by gravity, wherein an average particle size for sorting the powders into the coarse powders and the fine powders is 20 μm to 75 μm; and mixing the collected coarse powders with the collected fine particles by a recovering passage, whereby a mixture of the coarse powders and the fine particles is collected through the recovering passage, while the fine powders are discharged in such a manner that the fine powders are sucked and collected by the negative pressure collection unit.

3. A sand making method comprising:

crushing crushed materials by a crusher;

sorting the crushed materials obtained from the crusher into coarse particles, fine particles, and powders through air sorting by air blowing and screening by sorting with a screen, and collecting the fine particles that are sorted;

sucking and collecting the sorted powders by a negative pressure collection unit;

sorting the sucked and collected powders into coarse powders and fine powders by sucking the powders through negative pressure of the negative pressure collection unit so as to transmit the fine powders in a direction of the negative pressure while allowing the coarse powders to be dropped by gravity, and collecting the coarse powders that are dropped by gravity; and mixing the collected coarse powders with the collected fine particles by a recovering passage, whereby a mixture of the coarse powders and the fine particles is collected through the recovering passage, while the fine powders are discharged in such a manner that the fine powders are sucked and collected by the negative pressure collection unit, and a made sand is formed, the made sand comprising:

fine particles sorted as having particle sizes in a range of 5 mm to 20 μm, the fine particles being 75 to 85 weight percentages out of a total amount of the crushed materials; and coarse powders sorted as having particle sizes in a range of 300 μm to 20 μm, the coarse powders being 3 to 15 weight percentages out of the total amount of the crushed materials.

* * * * *